United States Patent [19]

Hukuta

[11] 4,390,107
[45] Jun. 28, 1983

[54] FUEL TANK CAP FOR MOTOR VEHICLE

[75] Inventor: Masakazu Hukuta, Tsushima, Japan

[73] Assignee: Kabushiki Kaisha Tokai Rika Denki Seisakusho, Aichi, Japan

[21] Appl. No.: 259,055

[22] Filed: Apr. 30, 1981

Related U.S. Application Data

[63] Continuation-in-part of Ser. No. 101,248, Dec. 7, 1979, abandoned.

[30] Foreign Application Priority Data

Oct. 21, 1980 [JP] Japan .............................. 55-150644[U]

[51] Int. Cl.³ ...................... B65D 51/16; B65D 55/14
[52] U.S. Cl. ..................................... 220/202; 137/43; 220/210; 220/303
[58] Field of Search .................. 137/43; 220/202, 203, 220/303, 210

[56] References Cited

U.S. PATENT DOCUMENTS

| | | | |
|---|---|---|---|
| 2,396,233 | 3/1946 | Abrams | 137/43 X |
| 2,757,223 | 7/1956 | Duncan | 137/43 X |
| 3,614,960 | 10/1971 | Pfrensk | 137/43 |
| 3,757,987 | 9/1973 | Marshall | 137/43 X |
| 3,768,498 | 10/1973 | Urban | 137/43 |
| 3,996,951 | 12/1976 | Parr et al. | 137/43 |
| 4,053,083 | 10/1977 | Hukuta | 220/303 X |

FOREIGN PATENT DOCUMENTS 472138  6/1952  Italy ........................................ 137/43

Primary Examiner—Allan N. Shoap
Attorney, Agent, or Firm—Wenderoth, Lind & Ponack

[57] ABSTRACT

A fuel tank cap for use in a motor vehicle including a cap body having a path communicating the interior of a fuel tank with the atmosphere and having incorporated therein a sensor valve unit. The sensor valve unit includes a valve housing having an upper wall with a first through-opening therein open to the path for communication with the atmosphere, a peripheral wall with a second through-opening at a predetermined position which is open to the housing interior and communicates with the fuel tank interior, an upright funnel shaped bottom wall, a weight ball movably positioned on the bottom wall, and a valve body resting on the weight ball so as to be moved upwards for closing the first through-opening when the weight ball rolls over the bottom wall and thereby carries out an upward movement.

3 Claims, 4 Drawing Figures

FUEL TANK CAP FOR MOTOR VEHICLE

This application is a continuation-in-part application of U.S. patent application Ser. No. 101,248 filed Dec. 7, 1979, now abandoned.

BACKGROUND OF THE INVENTION

The present invention relates and particularly to an improved cap for a fuel tank for use in a motor vehicle.

Generally, in a fuel tank of the gravity-feed type, in a two-wheeled motor vehicle and the like, there has been employed a fuel tank cap having a path formed in the fuel tank cap body for communicating the tank interior with the atmosphere so as to prevent an undesirable occurrence such as an impedance to the smooth feeding of the fuel due to a reduction of pressure in the fuel tank as the fuel is consumed.

The known fuel tank cap of the above described type, however, has the disadvantage that fuel contained in the fuel tank may leak to the atmosphere when the vehicle is inclined or tilted to a large degree, for example, by accidental overturn, etc.

In order to eliminate the aforementioned disadvantage, the present invention utilizes a conventional fuel tank cap in which a sensor valve unit is incorporated in the path communicating the tank interior with the atmosphere. The above arrangement, however, still has the disadvantage that, in addition to the fact that the sensor valve is incapable of absolutely closing the path, a valve body accommodated in a valve housing is undesirably often times lifted, thereby seating the valve, by an abnormally high internal pressure of the fuel tank caused by evaporation of the fuel within the fuel tank due to external heat or the like, and thus the path is blocked, which results in a further raising of the pressure within the fuel tank, resulting in even greater danger.

SUMMARY OF THE INVENTION

Accordingly, an essential object of the present invention is to provide an improved fuel tank cap for a motor vehicle in which, even when the motor vehicle is tilted to a large degree, a communicating path provided in the fuel tank cap body is arranged to be positively closed for substantially preventing external leakage of the fuel in the fuel tank, and yet the development of abnormally high pressure within the fuel tank is avoided, because a pressure increase within the tank caused by whatever means will not activate and close the communication path, thus substantially eliminating a disadvantage inherent in the conventional fuel tank caps.

Still another important object of the present invention is to provide an improved fuel tank cap of the above described type which has a simple construction, is reliable in operation, and can be readily used on fuel tanks of various motor vehicles at a low cost.

In accomplishing these and other objects in accordance with a preferred embodiment of the present invention, there is provided an improved fuel tank cap for use in a motor vehicle including a cap body having a path communicating the interior of a fuel tank with the atmosphere and having incorporated therein a sensor valve. The sensor valve comprises a valve housing having an upper wall formed with a first through-opening open to said path for communication with the atmosphere, a peripheral wall formed with a second through-opening at a predetermined portion thereof and open to said path for communication with the interior of the fuel tank, and an upright funnel shaped bottom wall, and a weight ball is movably placed on said bottom wall for rolling motion thereover. Further a plunger valve body is movably placed on the weight ball so as to be moved upwards whenever the weight ball exhibits a rolling upward movement. The substantial upward movement of the plunger valve causes the valve body to seat over the through-opening in said upper wall, thus closing the communication path.

By the arrangement according to the present invention as described above, the communicating path in the fuel tank cap is closed to prevent the leakage of the fuel upon the tilting of the motor vehicle to a large degree, and yet abnormal pressure increases within the fuel tank are advantageously avoided.

BRIEF DESCRIPTION OF THE DRAWINGS

These and other objects and features of the present invention will become apparent from the following description of a preferred embodiment as represented in the accompanying drawings, in which.

Before the description of the present invention proceeds, it is to be noted that like parts are designated by like reference numerals throughout the views of the accompanying drawings.

DETAILED DESCRIPTION OF THE INVENTION

Figure 1:
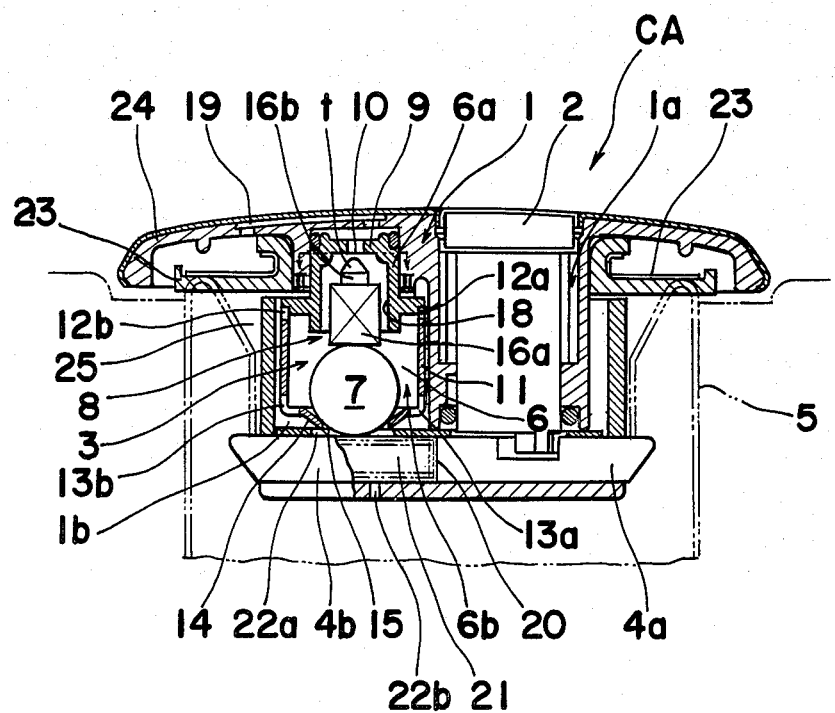
FIG. 1 is a side section view of a fuel tank cap according to one preferred embodiment of the present invention.

Referring now to the drawings, there is shown in FIG. 1 a fuel tank cap CA according to one preferred embodiment of the present invention which generally includes a cap body 1, a cylindrical lock 2 incorporated in a cavity 1a formed in the cap body 1, and a sensor valve 3 contained in a cavity 1b also formed in said cap body 1. In a position below and adjacent to the cylindrical lock 2, there are a pair of laterally extending lock bars 4a and 4b which are arranged to be projected out of or retracted into a side wall of the cap body 1 in response to the actuation of lock 2 by a key or otherwise. When actuated, the bars 4a and 4b fixedly engage a fuel tank mouth or part 5, as shown in chain lines in FIG. 1.

The sensor valve unit 3 includes a tubular valve housing 6 having a large diameter portion 6b and a reduced diameter portion 6a in which a weight ball 7 and a plunger type valve body 8 of plunger type are respectively accommodated.

Figure 2:
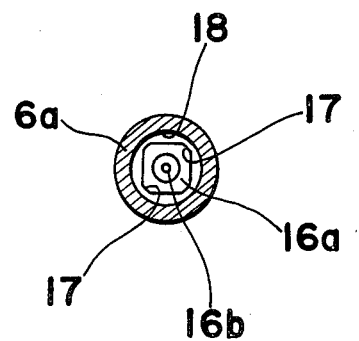
FIG. 2 is a cross section taken along the line II—II of FIG. 1.

The valve housing 6 has a through-opening 10 at a central portion in an upper wall 9 of the reduced diameter portion 6a, and through-openings 12a and 12b and 13a and 13b respectively positioned in the upper and lower portions of the side wall 11 of the large diameter portion 6b thereof. The bottom wall 14 of the large diameter portion 6b is funnel-shaped and has an opening 15 at its lower central portion, with the weight ball 7 being placed on the bottom wall 14 over the opening 15. The valve body 8 includes a comparatively heavy base portion 16a having a rectangular cross section and a projection 16b having a circular cross section having its upper end t conically shaped and extending upwardly from a central portion of the base portion 16a, the lower end of the base portion 16a resting on the ball 7 as shown in FIG. 1. Four corner portions 17 of the base portion 16a slidably contact the inner wall surface 18 of the reduced diameter portion 6a of the valve housing 6, as shown in FIG. 2, for permitting sliding movement of the valve body 8 in a vertical direction in FIG. 1 while leaving spaces between the inner surface 8 and the flat sides of the base portion 16a. The conical shaped upper end t of the projection 16b confronts the through-opening 10, which is provided in the upper wall 9 of the reduced diameter portion 6a of the valve housing 6, and the upper end t is arranged to seat in the through-opening 10 for closing said opening 10 upon rising of the valve body 8.

The through-opening 10 communicates with a path 19 provided in the cap body 1 for communication with the atmosphere. The other openings 12a and 12b and 13a and 13b are respectively communicated with the interior of the fuel tank through a passage formed by a cavity 21 in which a spring member 20 for outwardly urging the lock bars 4a and 4b, is accommodated, and through-openings 22a and 22b provided at upper and lower portions of said cavity 21.

On the under surface of a flange portion 24, on the upper portion of the cap body 1, there is provided a sealing member or gasket 23 so that, when the fuel tank cap CA is clamped onto the mouth 5 of the fuel tank, as in FIG. 1, the gasket 23 closely engages the upper edge of the mouth 5 and thereby prevents the fuel within the fuel tank from leaking through a gap 25 located between the side wall of the cap body 1 and the mouth 5.

By the above arrangement, so long as the motor vehicle (not shown) is kept in a normal attitude, the lower portion of the weight ball 7 rests stably in the opening 15 in the funnel shaped lower wall 14 of the valve housing 6, and the upper end t of the projection 16b of the valve body 8 resting on the weight ball 7 is spaced from the through-opening 10 in the upper wall 9 of the valve housing 6. Therefore, the interior of the fuel tank is communicated with the atmosphere via the opening 19 of the cap body 1, through-openings 10, 12a and 12b and 13a and 13b in the valve housing 6, spring cavity 21 and openings 22a and 22b in the upper and lower portions of the cavity 21, and thus the pressure inside the fuel tank is kept at atmospheric.

When the pressure inside the fuel tank is raised by some cause while the motor vehicle is in the normal attitude as described above, the gas under the increased pressure can readily escape toward the through-opening 10 through the spaces between the side faces of the rectangular base portion 16a of the valve body 8 and the inner peripheral wall 18 of the reduced diameter portion 6a of the valve housing 6. Meanwhile, since the valve body 8, is comparatively heavy, there is no possibility that the valve body 8 will be raised by the pressure of the gas to close the opening 10.

On the other hand, should the motor vehicle be tilted to a large degree, for example, by accidental overturn, etc., the weight ball 7 jumps out of the opening 15 in the funnel shaped bottom wall 14 of the valve housing 6 and rolls along said bottom wall 14, and thus the valve body 8 resting on the ball 7 is driven upwards by said rolling ball 7, so that the conical shaped upper end t of the projection 16b is seated in the through-opening 10 in the upper wall 9 of the valve housing 6 to thereby close said opening 10. Accordingly, the fuel flowing into the valve housing 6 from the fuel tank does not leak out of the through-opening 10.

As is clear from the foregoing description, since the fuel tank cap according to the present invention is provided with the path formed in the cap body for communicating the fuel tank interior with the atmosphere, the pressure within the fuel tank is normally held at atmospheric, and thus undesirable pressure reduction in the fuel tank due to fuel consumption or a pressure rise therein owing to evaporation of the fuel is advantageously prevented. By the provision of the valve housing, the weight ball disposed in said valve housing and the sensor valve constituted by the plunger type valve body in said path, the path is positively closed when the motor vehicle is tilted to large degree so as to prevent the leakage of the fuel from the fuel tank. On the other hand, the weight ball and valve body are stably accommodated in the valve housing so as not to be readily moved by a slight vibration of the motor vehicle or an increase in the internal pressure of the fuel tank, thus, substantially eliminating the possibility that the path will be undesirably closed.

In the arrangement of FIGS. 1 and 2 according to the present invention described so far, however, there may still be a possible disadvantage as described hereinbelow. That is to say, when the motor vehicle is restored to the normal attitude from a tilted state, the weight ball will return to its original position, and normally the valve body will return to its original position owing to the weight thereof so as to open the path. However, where there is a high gas pressure in the tank or the valve body is fitted tightly into the valve seat, the valve body may not readily withdraw from the valve seat, or it may encounter difficulty in returning to its original position, so that the path will undesirably be kept closed. Accordingly, an excessive rise in internal pressure of the fuel tank due to closing of the path may occur, causing serious danger. As a solution for the problem as described above, a valve body of having a larger weight may facilitate returning thereof to its original position, but this in turn, requires a weight ball of a larger weight, thus resulting in a large sized tank cap.

Figure 3:
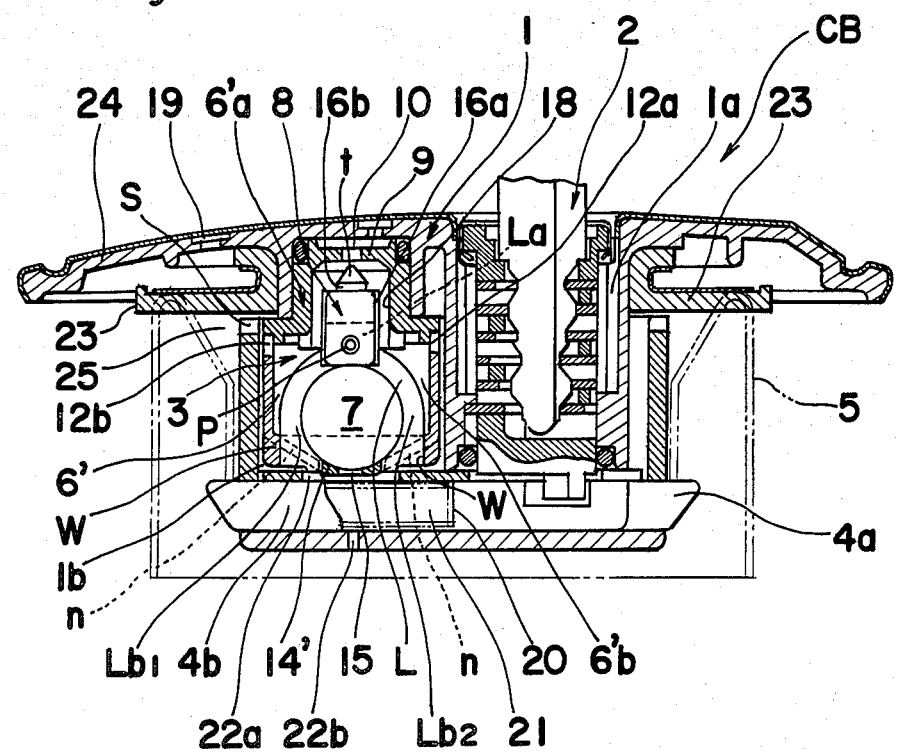
FIG. 3 is a view similar to FIG. 1, which particularly shows a modification thereof.
Figure 4:
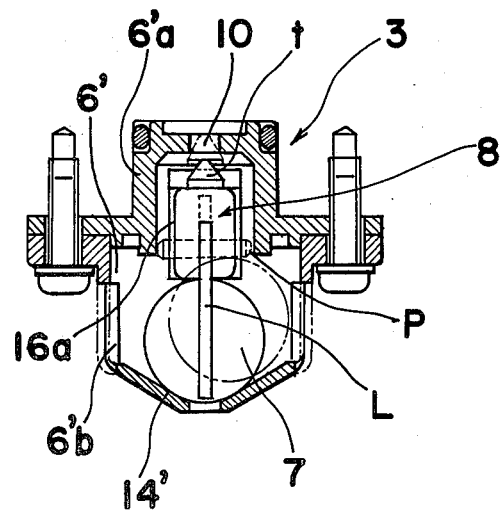
FIG. 4 is a sectional view showing, on an enlarged scale, a sensor valve unit employed in the modification of FIG. 3.

Referring to FIGS. 3 and 4, there is shown a modification of the arrangement of FIGS. 1 and 2. The modified tank cap CB of FIG. 3 is particularly intended to solve the above-described problem without any necessity for increasing the size of the tank cap by providing an arm member fitted around the weight ball and also pivotally connected by a pin to the valve body. Thus, when the weight ball returns to its original position, the valve body is forcibly returned to its original position by the arm member so as to open the path positively.

In the modification of FIGS. 3 and 4, there is provided, in addition to the structure of FIGS. 1 and 2, a generally C-shaped arm member L which is fitted around the weight ball 7 from above as shown, and a projection La at the top portion of the arm member L is pivotally connected by a pin P to the rectangular base portion 16a of the valve body 8 normally resting on the ball 7, and with the side portions Lb1 and Lb2 of the arm member L surrounding the corresponding diametrically opposite portions of the peripheral face of the ball 7. In addition, the valve housing 6 in the arrangement of FIGS. 1 and 2 is modified by changing the wall 14 thereof to a funnel-shaped bottom wall 14' having notches or slots n at opposite sides of said bottom wall 14', and by providing side walls W extending from the bottom of side wall 11 through said notches n. The lower ends of the side portions Lb1 and Lb2 of the arm member L are fitted into the corresponding notches n, while the peripheral edges of the side portions Lb1 and Lb2 slidably engage the surfaces of the side walls W for allowing the arm member L to reciprocate only in the vertical direction. Therefore, the weight ball 7 is permitted to roll along the funnel-shaped bottom wall 14' only in the lateral direction in FIG. 4, and when the ball 7 has been moved to a position shown by chain lines in FIG. 4, the arm member L is raised to cause the valve body 8 to ascend. Since the four corner portions of the base portion 16a of the valve body 8 contact the inner peripheral surface of the reduced diameter portion 6'a of the valve housing 6' for sliding movement of the valve body 8 only in the vertical direction as described earlier with reference to the embodiment of FIG. 1, the valve body 8 is raised or lowered as the weight ball 7 rolls along the funnel-shaped bottom wall 14' for selective opening or closing of the through-opening 10 in the upper wall of the valve housing 6' by the conical shaped upper end t of the projection 16b on the valve body 8. In the arrangement of FIG. 3, the through-opening 10 is communicated with the gas flow passage 19 formed in the cap body 1, while the openings 12a and 12b provided in the side wall of the large diameter portion 6'b of the valve housing 6' are communicated with a slot S in the cap body 1 and further communicated with the interior of the tank.

According to the tank cap CB having the construction as described above, the weight ball 7 rests stably on the central portion of the funnel-shaped bottom wall 14' of the valve housing 6' and the valve body 8 resting on said weight ball is spaced from the through-opening 10 in the upper wall 9 of the valve housing 6' so that said through-opening 10 is open as shown in FIG. 3, as long as the motor vehicle is in a normal attitude. Accordingly, the internal pressure of the fuel tank is maintained at atmospheric by communication between the interior of the fuel tank and the atmosphere via the through-opening 19 in the tank cap body 1, through-openings 10, 12a and 12b in the valve housing 6', and the slot S in the tank cap body 1.

Even when the internal pressure of the fuel tank rises for some cause while the motor vehicle is maintained in the normal attitude as described above, the high pressure gas will readily pass the through-opening 10 through the clearance between side faces of the rectangular portion 16a of the valve body 8 and the inner peripheral wall 18 of the reduced diameter portion 6'a of the valve housing 6'. Meanwhile, since the weight of the weight ball 7 is applied to the valve body 8 through the arm member L, said valve body 8 can never be pushed upwards by the gas pressure so as to close the through-opening 10.

On the other hand, when the motor vehicle is tilted to a large degree, for example, by accidental overturn, the weight ball 7 is driven out of the central portion of the funnel-shaped bottom wall 14' of the valve housing 6' and rolls therealong, so that the arm member L fitted around said weight ball 7 rises correspondingly. Therefore, the valve body 8 which is resting on the weight ball 7 and to which the arm member L is pivotally connected by a pin P, is pushed upwards and thus, the conical projection t is seated in the through-opening 10 so as to close said through-opening 10. Accordingly, the fuel flowing into the valve housing 6' from the tank never leaks through said through-opening 10. When the motor vehicle is restored to a normal attitude from a tilted position as described above, the weight ball 7 rolls over the bottom wall 14' to the central lowest position, so that the arm member L fitted around said weight ball is lowered, causing the valve body 8 connected to the arm member L to be lowered not only by its own weight but also by the weight of the weight ball 7 so as to open the through-opening 10. Thus, the internal pressure of the tank is always maintained at atmospheric.

Since other constructions and effects of the modified tank cap CB of FIGS. 3 and 4 are generally similar to those of the tank cap CA of FIGS. 1 and 2, a detailed description thereof is omitted here for brevity.

Although the present invention has been fully described by way of example with reference to the accompanying drawings, it is to be noted that various changes and modifications will be apparent to those skilled in the art. Therefore, if such changes and modifications do not depart from the scope of the present invention, they should be construed as included therein.

What is claimed is:

1. A fuel tank cap for use in a motor vehicle including a cap body having a path communicating the interior of a fuel tank with the atmosphere and having incorporated therein a sensor valve unit, said sensor valve unit comprising:

a valve housing having an upper wall with a first through-opening therein open to said path for communication with the atmosphere, a peripheral wall having a second through-opening at a predetermined portion thereof and open to said path for communication with the interior of the fuel tank, and a bottom wall having a funnel shape, a weight ball movably placed on said bottom wall for rolling motion thereover, a plunger type valve body resting on the weight ball, and an arm member fitted around diametrically opposite side portions of the peripheral surface of said weight ball, and pivotally connected to said valve body, said valve body being raised by said weight ball following upward movement of said weight ball during its rolling motion on said bottom wall so as to close said first through-opening in said upper wall, and being forcibly lowered by said arm member following downward movement of said weight ball during its rolling motion on said bottom wall so as to open said first through-opening.

2. A fuel tank cap as claimed in claim 1, wherein said arm member has a C-shape so as to embrace the peripheral surface of said weight ball at opposite side portions thereof so that said valve body and said weight ball will move in one unit.

3. A fuel tank cap as claimed in claim 1, further comprising a pin pivotally connecting said arm member at its top portion to said valve body.

* * * * *